United States Patent Office 2,931,787
Patented Apr. 5, 1960

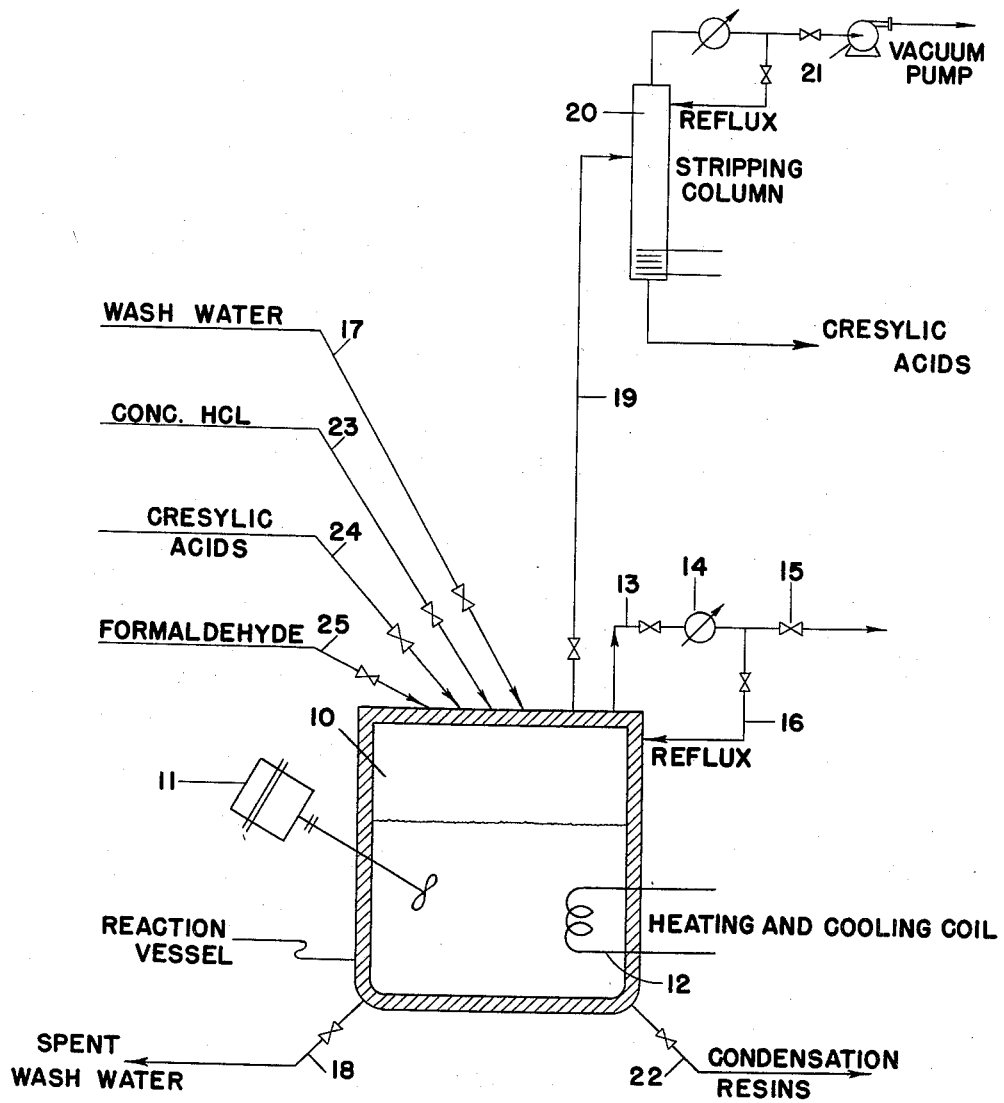

2,931,787

METHOD FOR RECOVERING PURIFIED PHENOLIC ISOMERS FROM LOW BOILING CRESYLIC ACIDS

Benjamin W. Jones, Bridgeville, and Martin B. Neuworth, Pittsburgh, Pa., assignors to Consolidation Coal Company, a corporation of Pennsylvania Application February 18, 1955, Serial No. 489,104

4 Claims. (Cl. 260—53)

The present invention relates to the treatment of raw cresylic acids for the selective removal of certain phenolic isomers to permit recovery of other phenolic isomers in a purified form. More particularly, it relates to a method for selectively resinifying certain phenolic isomers from raw cresylic acids.

Raw cresylic acids occur as by-products of petroleum processing, in the liquid products from the destructive distillation of coals and the like, in shale oil, in the liquid products from coal hydrogenation, et cetera. The lower boiling cresylic acids which have commercial value are recovered as a distillate fraction boiling in the range of 160 to 230° C. They include phenol, ortho-, meta-, and para-cresol, 2,3-, 2,4-, 2,5-, 2,6-, 3,4-, and 3,5-xylenol, and meta- and para-ethyl phenol. The lowest boiling material, phenol itself, usually is recovered separately by a simple distillation. The remaining cresylic acids, on fractional distillation, occur as isomer pairs which are difficult to recover in purified form by conventional processing techniques. Ortho-cresol and 2,6-xylenol boil together; meta-cresol and para-cresol boil together; 2,4-xylenol and 2,5-xylenol boil together; meta-ethyl phenol and para-ethyl phenol boil together; the remaining isomers, 2,3-, 3,4-, and 3,5-xylenol have rather widely separated boiling points and can readily be recovered in purified form as distillates. The approximate boiling temperatures of the phenolic isomers in low temperature cresylics are tabulated in Table I.

Table I.—Boiling temperatures of cresylic acids

| Fraction | Principal components | Boiling temperature, °C. |
|---|---|---|
| I | Phenol | 180 |
| II | Ortho-cresol | 191 |
|    | 2,6-xylenol | 201 |
| III | Meta-cresol | 202 |
|     | para-cresol | 202 |
| IV | 2,4-xylenol | 212 |
|    | 2,5-xylenol | 212 |
| V | 2,3-xylenol | 214 |
| VI | m-Ethyl phenol | 218 |
|    | p-Ethyl phenol | 218 |
| VII | 3,5-xylenol | 220 |
| VIII | 3,4-xylenol | 225 |
| IX | Trimethyl phenols | 230 |

When raw low boiling cresylic acids are separated by fractional distillation, it is the usual practice to recover phenol itself as a top cut (I). The ortho-cresol and 2,6-xylenol appear in the next distillate fraction (II). Meta-cresol and para-cresol occur in the next distillate fraction (III). 2,4-xylenol and 2,5-xylenol appear in the next distillate fraction (IV). 2,3-xylenol can be recovered by itself in the next distillate fraction (V). Meta-ethyl phenol and para-ethyl phenol are recovered in the next fraction (VI). 3,5-xylenol and 3,4-xylenol can be recovered in nearly pure form in the succeeding fractions (VII, VIII). Trimethyl phenols comprise the still residue (IX). Distillate fractions III, IV and VI contain phenolic isomers in mixtures from which they cannot be separated by conventional recovery methods (distillation, extraction, crystallization and the like). Moreover, each of the phenolic isomers in the fractions III, IV and VI is a chemical of commerce, which in a purified form commands premium prices.

One of the primary uses of meta-cresol occurring in fraction III is in the production of formaldehyde condensation resins which are useful in molding compositions, lacquers, varnishes and the like. The 2,5-xylenol of fraction IV and the meta-ethyl phenol of fraction VI similarly find their primary uses in the production of formaldehyde condensation resins. If it were possible to remove the meta-cresol, 2,5-xylenol and meta-ethyl phenol from the raw cresylic acids, the subsequent separation of the cresylic acids by fractional distillation could be carried out to recover the remaining phenolic isomers as substantially pure products of a single fractional separation.

We have discovered a simple, inexpensive, single stage treatment which permits removal of meta-cresol, 2,5-xylenol and meta-ethyl phenol from raw cresylic acids in the form of a mixed formaldehyde condensation resin— the form in which these three isomers find most of their industrial applications. The phenolic isomers remaining after removal of meta-cresol, 2,5-xylenol and meta-ethyl phenol can be recovered in high purity via simple fractional distillation.

To effect our new separation the raw cresylic acids are treated in the presence of a strongly dissociated acid as catalyst with 0.8 to 1.2 mols of formaldehyde per mol of meta-cresol, meta-ethyl phenol and 2,3-, 2,5-, 3,4-, and 3,5-xylenol in the raw cresylics. When the formaldehyde has been substantially consumed by the reaction, substantially all the meta-cresol, 2,5-xylenol and meta-ethyl phenol will have polymerized into a clear, thermoplastic resin, leaving unreacted and available for recovery those other phenolic isomers existing in the raw cresylic acids.

The condensation of phenolic materials with formaldehyde is well known in the art. Each of the phenolic isomers (phenol, cresols, xylenols and ethyl phenols) individually will form formaldehyde condensation resins when condensed under the proper conditions. In fact it is not uncommon to prepare resins from a mixture of phenolic materials occurring in a distillate fraction by reaction with excess formaldehyde. However, it is the primary object of this invention to modify the isomer distribution of raw cresylic acids to permit recovery of certain isomers in purified form. We alter this isomer distribution by selectively removing through resinification one component of each difficult to separate isomer pair. The resinification treatment also produces a valuable resin which has commercial utility.

For a clearer understanding of the present invention, its objects and advantages, reference should be had to the following description and accompanying drawing, which is a schematic illustration of apparatus for carrying out the preferred embodiment of the present process.

Referring to the drawing, a reaction vessel 10 is provided for carrying out the present process batchwise. The reaction vessel 10 is provided with mixing apparatus 11 for agitating its contents and heating and cooling coils 12 to control the temperature of the vessel.

Leading from the reaction vessel 10 is a valved conduit 13 having a cooling condenser 14 and an atmospheric pressure relief valve 15. A valved reflux conduit 16 is provided for returning condensate from the conduit 13 to the reaction vessel 10. A valved conduit 17 is provided for introducing wash water into the reaction vessel 10 and a second valved conduit 18 is provided for removing spent wash water. A valved conduit 19 is provided for removing volatile materials to an overhead product recovery system, indicated generally by the numeral 20, under the influence of a vacuum pump 21. A valved conduit 22 is provided for removing reaction products from the vessel 10. Reactant materials and reagents are introduced into the reaction vessel as indicated at 23, 24 and 25.

Feed material containing raw cresylic acids is introduced into the reaction vessel 10 as indicated by the line 24. In most cases the feed material will be a distillate fraction of raw cresylic acids boiling generally below 230° C. and above about 190° C. This fraction will contain all the normally commercially valuable phenolic materials except phenol itself which is readily separable from the other cresylic acids by simple distillation. Normally some of the ortho-cresol in the raw cresylics will be removed along with the topped phenol. Thus the feed material contains all of the meta-cresol, para-cresol, xylenols, ethyl phenols and some of the ortho-cresol existing in the raw cresylic acids.

The liquid phase catalyst which we have found essential for producing the desired resinification is introduced into the reaction vessel as indicated at 23. For our purpose the condensation catalyst is a highly dissociated acid in quantities up to about 10% of the weight of cresylic acid. Because of relatively low cost and convenience of handling, the preferred catalyst is concentrated hydrochloric acid. The catalytic material should be chemically inert toward the reactant cresylic acids. Dilute sulfuric acid, oxalic acid and the like also are suitable.

When the charge has been introduced into the reaction vessel 10, formaldehyde or materials which engender formaldehyde (formalin, para-formaldehyde, trioxymethylene, etc.), is introduced gradually as indicated at 25. The contents of the reaction vessel 10 are maintained in agitation by the mixing apparatus 11. Under the conditions of the reaction, formaldehyde selectively condenses exothermically with meta-cresol, 2,5-xylenol and meta-ethyl phenol (also the 2,3-, 3,4- and 3,5-xylenol) in the cresylic feed material in preference to the other phenolic materials contained in the reaction vessel. Gradual addition of formaldehyde is continued until from 0.8 to 1.2 mols of formaldehyde have been added for each mol of meta-cresol, meta-ethyl phenol and 2,3-, 2,5-, 3,4-, and 3,5-xylenol contained in the cresylic feedstock. The exothermic nature of the formaldehyde condensation causes the temperature of the reactants to rise. To control the temperature within the reaction vessel 10, either heating or cooling media can be circulated through the coil 12. If desired, the acid catalyst may be mixed with the formaldehyde and the mixture gradually added to the reaction vessel containing the cresylic acids.

Following addition of the desired quantity of formaldehyde, the reaction vessel is maintained at a formaldehyde condensation temperature (50 to 100° C.) until the formaldehyde has been substantially consumed. At this point, substantially all the meta-cresol, 2,5-xylenol and meta-ethyl phenol in the feed has been condensed into a formaldehyde condensation resin which exists in mixture with unreacted cresylic acids, traces of unreacted formaldehyde, the condensation catalyst and some water.

Thereupon wash water is introduced through conduit 17 into the reaction products in the vessel 10 to cool the mixture and to extract the catalyst therefrom. Since both the cresylic acids and the condensation resins are insoluble in water, decantation may be employed to remove wash water through conduit 18. The washing cycle is repeated until the effluent wash water in conduit 18 is virtually neutral. Alternatively the catalyst may be neutralized by addition of lime, caustic and the like.

Thereupon the unreacted cresylic acids are recovered from the vessel 10 by vacuum distillation by heating the reaction products by means of the heating coil 12. The unreacted cresylic acids, together with other volatile materials (water, formaldehyde) are flashed overhead through conduit 19 to a recovery system 20 under the influence of a vacuum pump 21. Cresylic acids, separable by distillation, are recovered as a bottom product in the recovery system 20; other volatile materials pass through the vacuum pump 21 for disposal. When substantially all the unreacted cresylic acids have been flashed overhead from the reaction vessel 10, the product condensation resin may be recovered through the conduit 22. Solvents, such as toluene, may be added to the reaction vessel to reduce the viscosity of the resin being withdrawn through the conduit 22; in general, at the temperature existing in the vessel 10, the product resin can be withdrawn without the addition of solvents.

Variations in the preferred embodiment which has been described are permissible without departing from the scope and spirit of the present invention. For example, any recovery technique based upon differences in relative volatility may be employed, e.g., steam stripping, as a substitute for the vacuum distillation described in connection with the drawing; a solvent such as toluene may be added to the reaction vessel prior to commencing the reaction.

We have found that excellent results may be obtained by carrying out the reactions of the present invention at temperatures below 100° C. The required reaction time is, as expected, interdependent with the reaction temperature. In all cases, thirty minutes reaction time at a temperature of 100° C. has been sufficient to consume virtually all the formaldehyde. Where the exothermic heat of the condensation reaction is utilized to increase the temperature of the reactants concurrently with the addition of formaldehyde, a final temperature of 100° C. results in complete consumption of the formaldehyde with no further reaction time.

The efficiency of removing meta-cresol, 2,5-xylenol and meta-ethyl phenol is sensitive to the mol ratio of formaldehyde to these materials. Where the mol ratio of formaldehyde to the named isomers is less than 1/1, the non-reacting phenols can be recovered in high yields although still slightly contaminated with the three isomers. The non-reacting cresylic acids can be recovered in a virtually pure form when the mol ratio of formaldehyde to the named isomers is in excess of 1/1, although the yield of the non-reacting isomers decreases.

The present invention is particularly applicable to those cresylic acid feedstocks containing less than 40% of meta-cresol, meta-ethyl phenol and 2,5-xylenol. In practice this imposes no real limitations since the usual sources of cresylic acids (high temperature tars, low temperature carbonization tars and petroleum cresylics) normally contain substantially less than 40% of these three isomers.

The following Table II illustrates the isomer distribution of phenolic materials in typical cresylic acid feedstocks.

Table II.—Distribution of phenolic materials in raw cresylics

| Source | High temperature tar | Low temperature carbonization tar | | Petroleum cresylics |
| --- | --- | --- | --- | --- |
| | | I [1] | II [2] | |
| Phenol (weight percent) | 28.4 | 14.2 | 12.4 | 14.2 |
| Ortho-cresol | 13.8 | 15.6 | 14.7 | 17.4 |
| 2,6-xylenol | | | | 0.9 |
| Meta-cresol | 23.7 | 14.2 | 18.7 | 17.7 |
| Para-cresol | 12.5 | 10.4 | 15.7 | 8.0 |
| 2,4-xylenol | 4.5 | 16.7 | 5.1 | 9.0 |
| 2,5-xylenol | 2.5 | 8.8 | 8.1 | 7.1 |
| 2,3-xylenol | 1.3 | 3.7 | 2.2 | 2.4 |
| 3,4-xylenol | 2.8 | 1.1 | 6.3 | 3.5 |
| 3,5-xylenol | 6.3 | 8.8 | 6.0 | 5.5 |
| m-Ethyl phenol | 2.4 | 4.7 | 6.2 | 8.5 |
| p-Ethyl phenol | 1.0 | 1.0 | 4.4 | |
| Trimethyl phenols | | | | 4.8 |

[1] Produced by tumbling bituminous coal in rotating kiln.
[2] Produced by fluidized low temperature carbonization.

A brief inspection of Table II shows that the meta-cresol comprises between 50 and 70% of the meta- and para-cresol fraction. The 2,4-xylenol comprises between 35 and 70% of the 2,4-xylenol and 2,5-xylenol fraction. The meta-ethyl phenol comprises between 55 and 85% of the ethyl phenol fraction of the raw cresylics. In all cases the meta-cresol, meta-ethyl phenol and 2,5-xylenol comprise less than 40% of the total cresylic acids in the feedstock. As can be calculated (on a phenol-free basis) from Table II, and from Table III below, the maximum-minimum ranges based on total cresylic acids are about 9–18 percent p-cresol, about 6–20 percent 2,4-xylenol, and about 1–6 percent p-ethylphenol.

An example illustrating the operation of the present invention is reported as run A in Table III. The feedstock for this example was a distillate fraction of cresylic acids from tar produced by low temperature carbonization of bituminous coal in a rotating retort. The total tar was separated into neutral oils and tar acids; a distillate fraction of the tar acids boiling from about 190 to 230° C. was selected as the feedstock. This feedstock had been freed of phenol itself by topping which also resulted in removal of some ortho-cresol. The raw cresylic acids were introduced into a glass, round bottomed flask and agitated mechanically with a motor driven stirrer. A measured quantity of catalyst was added (4% concentrated hydrochloric acid) and the dropwise addition of formalin was initiated. Approximately thirty minutes was required to introduce the measured quantity of formaldehyde, at which time the temperature in the flask attained a value of about 100° C. A total of 1.1 mols of formaldehyde was employed for each mol of meta-cresol, 2,5-xylenol, meta-ethyl phenol and 3,5-xylenol in the cresylic feedstock. The reactants were held at 100° C. for thirty minutes and thereupon chilled by the addition of an approximately equal quantity of distilled wash water.

Following agitation between the wash water and the catalyzate, the aqueous phase was decanted and fresh distilled wash water was added. About ten washing cycles were required before the decanted wash water was neutral. Thereupon the contents of the reaction flask were vacuum distilled at 2 mm. Hg to a temperature of about 200° C. to flash overhead the unreacted cresylic acids. The condensation resin remaining in the flask was a clear, thermoplastic resinous substance, pale yellow in color; it exhibited good heat and light stability.

Run B of Table III was carried out to demonstrate the results which can be expected where no catalysis is employed. The conditions of run B were identical with those of run A except that (1) no catalyst was added; (2) the reaction mixture was maintained at a temperature of 100° C. for 30 hours (rather than the 30 minutes of run A) to assure attainment of equilibrium; and (3) water washing of the product was unnecessary.

A further run was carried out with alkaline catalysis (1 part by weight of sodium hydroxide per 100 parts by weight of cresylic acids). Otherwise the conditions of this further run were identical with those of run A. No attempt was made to analyze the products since the resulting resin proved to be thermosetting, and hence, unusable.

Table III.—Separation of cresylic acids

| Run—Composition weight percent | Feed | Composition of unreacted phenols weight percent | |
|---|---|---|---|
| | | A Acid catalysis | B No catalysis |
| A—phenol | | | |
| B—ortho-cresol | 1.6 | 1.2 | 0.9 |
| 2,6-xylenol | 2.3 | 2.4 | 4.2 |
| C—meta-cresol | 21.9 | 3.5 | 16.0 |
| para-cresol | 15.6 | 25.6 | 27.8 |
| D—2,4-xylenol | 16.2 | 37.8 | 29.3 |
| 2,5-xylenol | 8.1 | 0.0 | 1.4 |
| E—2,3-xylenol | 1.5 | 0.0 | 0.3 |
| F—m-ethyl phenol | 7.0 | 3.8 | 4.9 |
| p-ethyl phenol | 6.1 | 13.2 | 9.1 |
| G—3,5-xylenol | 7.6 | 1.8 | 0.6 |
| H—3,4-xylenol | 7.0 | 0.0 | 2.0 |
| I—trimethyl phenols | 5.0 | 10.7 | 3.5 |

In run A, 72.2 weight percent of the cresylic acids were converted to a thermoplastic resin and 27.8 parts recovered as unreacted cresylic acids. The conversion of cresylic acids in run B was only 53.4 weight percent with accompanying recovery of 46.6 weight percent of the cresylic acids as unreacted materials.

Table IV has been prepared to contrast the results of the selective resinification of the present invention (run A) with those of the uncatalyzed treatment (run B).

Table IV

| Run | Feed | Unreacted cresylic acids | |
|---|---|---|---|
| | | A | B |
| Distillate fraction (see Table I). | | | |
| C—p-cresol purity | 41.6 | 87.9 | 63.5 |
| D—2,4-xylenol purity | 66.7 | 100 | 95.5 |
| F—p-ethyl phenol purity | 46.6 | 77.7 | 65.0 |

From Table IV it is seen that the present process results in greater enrichment of each of the difficultly separable distillate fractions C, D and F, than the enrichment obtained through uncatalyzed partial resinification.

It should be emphasized, however, that the resin resulting from the uncatalyzed treatment (run B) is thermoplastic as is the resin from the acid catalyzed treatment (run A). This is in contrast to the thermosetting resins which are produced from alkaline catalyzed treatments of cresylic acids distillates.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:
1. A single-condensation stage process for purifying a liquid mixture consisting essentially of cresylic acids boiling not higher than about 230° C. and substantially free of phenol and containing meta-cresol, para-cresol, 2,3-xylenol, 2,4-xylenol, 2,5-xylenol, 3,4-xylenol, 3,5-xylenol, m-ethylphenol and p-ethylphenol, the para-cresol being present in about 30–50 percent by weight of the combined meta-resol and para-cresol, the 2,4-xylenol being present in about 35–70 percent by weight of the combined meta-cresol and para-cresol, the 2,4-xylenol being present in about 15–45 percent by weight of the combined m-ethylphenol and p-ethylphenol, there being present by weight of the total cresylic acids about 9–18 percent p-cresol, about 6–20 percent 2,4-xylenol, and about 1–6 percent p-ethylphenol, which comprises reacting the cresylic acid mixture with a quantity of condensing material selected from the class consisting of formaldehyde, formalin, para-formaldehyde and trioxymethylene, capable of engendering 0.8 to 1.2 mols of formaldehyde for each mol of meta-cresol, 2,3-xylenol, 2,5-xylenol, 3,4-xylenol, 3,5-xylenol and m-ethylphenol in said mixture of cresylic acids in the presence of catalytic amounts of a strongly dissociated acid condensation catalyst until substantially all the formaldehyde is consumed, whereby a thermoplastic formaldehyde condensation resin is formed, and separating said resin from the mixture, the unreacted cresylic acids remaining in the mixture having a concentration of para-cresol, 2,4-xylenol and p-ethylphenol greater than their respective concentrations contained in said starting liquid mixture of cresylic acids.

2. A process according to claim 1 wherein said catalyst is concentrated hydrochloric acid.

3. A process according to claim 1 wherein said catalyst consists of 2 to 10 percent by weight of concentrated hydrochloric acid based upon the weight of said starting mixture.

4. A process according to claim 1 wherein said condensation reaction is conducted at a condensation reaction temperature between 50° C. and 100° C.

References Cited in the file of this patent

UNITED STATES PATENTS

| 1,214,414 | Berend | Jan. 30, 1917 |
| 1,658,281 | Buetner | Feb. 7, 1928 |

OTHER REFERENCES

Ellis: "Chemistry of Synthetic Resins," vol. 1, Reichold Pub. Co., N.Y.; (1935), page 366. (Copy in Division 60.)

Chemistry of Synthetic Resins, Ellis, vol. 1, page 292; Reichold Publishing Co., N.Y. (1935). (Copy in Division 50.)

Chemistry of Synthetic Resins, Ellis, vol. 1, pp. 362–363 and 365 Reichold Publ. Co., N.Y. (1935).

UNITED STATES PATENT OFFICE
CERTIFICATION OF CORRECTION

Patent No. 2,931,787 April 5, 1960

Benjamin W. Jones et al.

It is hereby certified that error appears in the above numbered patent requiring correction and that the said Letters Patent should read as corrected below.

Column 6, line 47, for "meta-resol" read -- meta-cresol --; line 49, for "combined meta-cresol and para-cresol, the 2,4-xylenol" read -- combined 2,4-xylenol and 2,5-xylenol, the p-ethylphenol --.

Signed and sealed this 9th day of May 1961.

(SEAL)
Attest:

ERNEST W. SWIDER
Attesting Officer

DAVID L. LADD
Commissioner of Patents